United States Patent [19]
Watkins

[11] Patent Number: 5,381,619
[45] Date of Patent: Jan. 17, 1995

[54] HOLLOW FISHING ROD

[76] Inventor: Ty Watkins, 220 Lakewood Dr., Waterboro, S.C. 29488

[21] Appl. No.: 103,331

[22] Filed: Aug. 6, 1993

[51] Int. Cl.⁶ .................................. A01K 87/00
[52] U.S. Cl. .............................. 43/18.1; 43/24
[58] Field of Search .................. 43/18.1, 18.5, 24

[56] References Cited

U.S. PATENT DOCUMENTS

| | | | |
|---|---|---|---|
| 1,595,275 | 8/1926 | White | 43/18 |
| 2,394,706 | 2/1946 | Makie | 43/24 |
| 2,652,654 | 9/1953 | Bahn | 43/24 |
| 2,729,012 | 1/1956 | Lee | 43/24 |
| 2,735,208 | 2/1956 | Bartetti | 43/24 |
| 2,742,728 | 4/1956 | Boyd | 43/18.5 |
| 2,776,516 | 1/1957 | Jennette | 43/24 |
| 2,777,239 | 1/1957 | Cushman | 43/24 |
| 2,808,676 | 1/1957 | Major | 43/18.5 |
| 2,895,251 | 7/1959 | Karry | 43/24 |
| 3,279,116 | 10/1966 | Chapman | 43/24 |
| 3,314,186 | 4/1967 | Vivieros | 43/18.1 |
| 3,417,500 | 12/1968 | Carabasse | 43/18.1 |
| 3,432,958 | 3/1969 | Bellinger | 43/18.1 |
| 3,477,254 | 6/1969 | Sobel et al. | 43/18.1 |
| 3,618,253 | 11/1971 | Edwards et al. | 43/18.1 |
| 3,789,533 | 2/1974 | Bowerfind et al. | 43/18.1 |
| 3,862,509 | 1/1975 | Petersen, Jr. | 43/18.1 |
| 4,020,581 | 5/1977 | Genovese | 43/18.5 |
| 4,183,163 | 1/1980 | Reimer | 43/24 |
| 4,212,126 | 7/1980 | Barnett | 43/24 |
| 4,541,197 | 9/1985 | LeRoue | 43/18.1 |
| 4,878,309 | 11/1989 | Gough | 43/18.1 |
| 5,159,776 | 11/1992 | Horton et al. | 43/24 |

*Primary Examiner*—Kurt C. Rowan
*Attorney, Agent, or Firm*—Michael A. Mann

[57] ABSTRACT

A fishing rod with a hollow shaft that neither inhibits movement of the fishing line through the hollow shaft nor succumbs to frictional wear resulting from movement of the fishing line against the interior wall of the hollow shaft. The hollow shaft is made of a flexible material, such as fiberglass or graphite, and connected to a handle having a fishing reel oriented so that fishing line from the fishing reel is approximately aligned with and passes through the interior of the shaft. The interior surface of the hollow shaft is coated with a smooth, wear resistant material. The lower portion of the first coating is coated with a second material that is resistant to abrasion caused by repeated movement of the fishing line. Both coatings are nonreactive to the fishing line, thus minimizing frictional interaction between the interior of the hollow shaft and the fishing line moving therethrough. A reinforced tip maintains the integrity of the end of the hollow shaft.

20 Claims, 1 Drawing Sheet

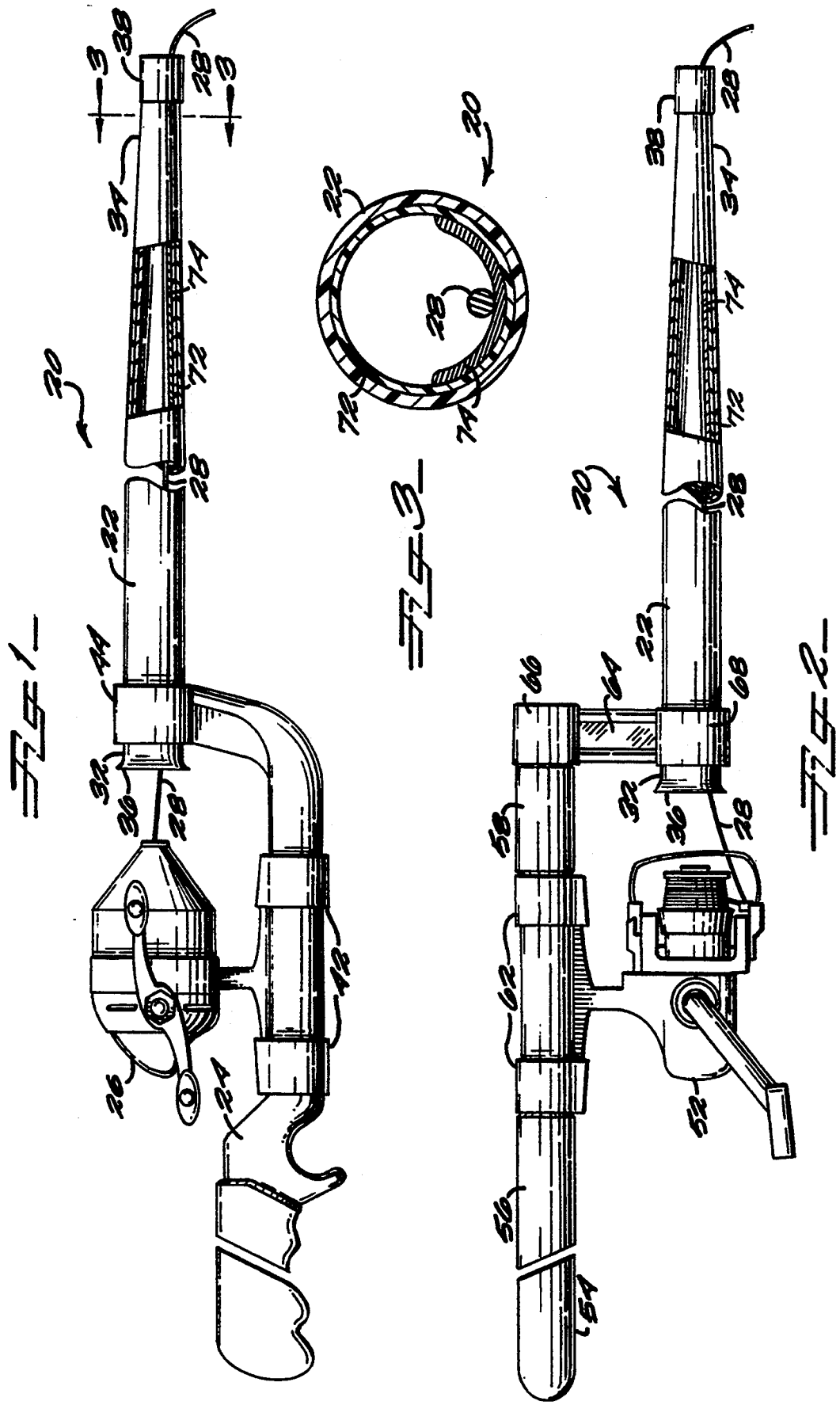

HOLLOW FISHING ROD

BACKGROUND OF THE INVENTION

1. Field of the Invention

The present invention relates to fishing rods. More particularly, the present invention relates to fishing rods having hollow shafts for running fishing line therethrough.

2. Discussion of Background

Fishing rods with hollow shafts are well known in the prior art. Most hollow fishing rods allow fishing line to be fed from a fishing reel, mounted near the handle, through the hollow shaft to the tip of the shaft. Fishing rods that do not have hollow shafts normally use a plurality of eyelets attached along the shaft for guiding the fishing line from the fishing reel to the tip of the fishing rod. Hollow shafts protect the fishing line from snagging or becoming entangled, which usually accompanies the use and storage of fishing rods with external eyelets and exposed fishing line.

Despite their protective characteristics, fishing rods with hollow shafts tend to operate less successfully that fishing rods with external eyelets because of the increased surface area contact and eventual wear between the interior of the hollow shaft and the fishing line moving therethrough. Consequently, most attempts to improve the operability of hollow fishing rods focus on means for minimizing contact between the fishing line and the interior surface of the hollow shaft while guiding the fishing line therethrough.

For example, U.S. Pat. No. 4,212,126, issued to Barnett, discloses a fishing rod with a hollow shaft having a series of frusto-conical line guides along the interior of the hollow shaft for minimizing contact between the fishing line and the interior surface of the rod. Similarly, LeRoue, in U.S. Pat. No. 4,541,197, describes a hollow fishing rod with a series of internal grommets for holding the fishing line off of the interior surface of the rod, thus reducing friction on the fishing line.

Other improvements of a slightly different nature are disclosed in U.S. Pat. Nos. 4,020,581 and 1,595,275, issued to Genovese and White, respectively. In U.S. Pat. No. 4,020,581, Genovese describes a hollow fishing rod comprising a plurality of cylindrical blanks connected together telescopically. The outermost tip of the hollow rod has a bushing to keep fishing line in the rod from laying against the walls of the blanks where it might become hung up or snagged. White, in U.S. Pat. No. 1,595,275, describes a hollow fishing rod with a metallic tube lining for guiding fishing line therethrough.

Of the many types of hollow fishing rods known to exist, most of them minimize contact between the fishing line and the interior of the rod in an attempt to minimize drag and eventual wear on the fishing line. However, this approach sacrifices the rod's sensitivity in response to movement by the fishing line caused by striking fish and often restricts movement of the fishing line while casting. Also, hollow fishing rods with intricate internal members such as grommets, line guides and the like, are difficult to manufacture and repair.

There exists a need for a practical fishing rod that protects the fishing line from entanglement, yet does not cause friction and wear on the fishing line nor decrease the overall sensitivity of the fishing rod.

SUMMARY OF THE INVENTION

According to its major aspects and broadly stated, the present invention is a fishing pole with a hollow shaft for fishing line to pass through. In particular, it is a fishing pole with a hollow shaft that neither inhibits movement of the fishing line through the hollow shaft nor succumbs to frictional wear resulting from contact between the fishing line and the interior wall of the hollow shaft. The fishing rod comprises a hollow, cylindrical shaft made of a flexible material such as fiberglass or graphite. The shaft is connected to a handle having a fishing reel oriented so that fishing line from the fishing reel is approximately level with and passes through the interior of the shaft and exits the tip of the shaft. The entire interior surface of the hollow shaft from the handle to the tip is coated with a smooth, wear-resistant material. The lower portion of the first coating is coated with a second material that is also smooth and resistant to abrasion caused by repeated movement of the fishing line. Both coatings are nonreactive to the fishing line thereby minimizing frictional interaction between the interior of the hollow shaft and the fishing line moving therethrough. Also, the hollow shaft has a reinforced tip, made of a material such as ceramic or porcelain, to keep the tip of the hollow shaft from fraying or wearing.

A major feature of the present invention is the use of a hollow shaft rather than a plurality of eyelets for guiding the fishing line from the fishing reel. The hollow shaft is made of a firm yet flexible material such as fiberglass, boron or graphite. The advantage of this feature is that the fishing line is protected from entanglement during operation and storage of the fishing rod without sacrificing the rod's sensitivity to movement of the fishing line in response to fish striking the fishing line.

Another feature of the present invention is the use of a first coating along the interior surface of the hollow fishing rod. The first coating is preferably polytetrafluorethylene (available under the trademark TEFLON®) or similar material. This feature provides a smooth, nonreactive finish to the interior of the hollow shaft that does not inhibit movement of the fishing line through the hollow rod.

Still another feature is the use of a second coating along the lower portion of the interior surface of the first coating. Similar to the first coating, the second coating is preferably a wear resistant material that allows fishing line to move freely across the interior surface of hollow shaft. The advantage of this feature is that the second coating provides a smooth surface for fishing line to move along yet does not break down or wear excessively upon repeated fishing line movement, which would otherwise tend to inhibit movement of the fishing line through the interior of the fishing rod.

Yet another feature is the reinforced distal tip of the hollow shaft. The exterior surface of the distal tip of the shaft is preferably dipped in a material such as ceramic or porcelain. The reinforced tip prevents wearing or fraying of the edge of the hollow shaft thus prolonging the life of the fishing rod.

Another feature of the present invention is the connecting means used to connect the handle and the hollow shaft. The connecting means is preferably an adjustable, quick-setting and release latch-type connector that allows the hollow rod to be connected to various handles that have either bait-cast or open-faced spinning reels. This feature increases the versatility of the hollow shaft, allowing it to be used with many different handle and fishing reel combinations.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 1 is a partial cross-sectional view of a hollow fishing rod with a bait-cast reel according to a preferred embodiment of the present invention;

FIG. 2 is a partial cross-sectional view of a hollow fishing rod with an open-faced, spinning reel according to a preferred embodiment of the present invention; and FIG. 3 is a cross-sectional view of the hollow fishing rod taken along lines 3—3 of FIG. 1.

DETAILED DESCRIPTION OF A PREFERRED EMBODIMENT

In the following description similar components are referred to by the same reference numeral in order to simplify the understanding of the sequential aspect of the drawings.

Referring now to FIG. 1, the hollow fishing rod 20 in its first preferred embodiment is a flexible shaft 22 connected to a handle 24 with a fishing reel 26 mounted thereon. Fishing reel 26 has fishing line 28 that preferably passes from reel 26 through shaft 22 from a proximal end 32 of shaft 22 to a distal end 34 of shaft 22.

Shaft 22 is preferably a hollow, slightly tapered cylinder having a length in the range of approximately 5.50 feet to 8.00 feet. Shaft 22 is preferably made of a strong, flexible and resilient material that can be manufactured easily into a hollow, cylindrical shaft. Such materials include but are not limited to fiberglass, boron, graphite, titanium and the like.

Because of the relative ease of manufacture and plurality of available materials, shaft 22 can be made in different lengths and with varying flexes depending on the type of fishing desired. The flex is the ability of shaft 22 to bend without losing its "memory"; that is, after it flexes, it returns to its original shape.

Obviously, it would be desirable to have shaft 22 made with a great degree of flex for use in fishing for bream or other small fish. which are usually within the range of approximately 1 to 5 pounds. Similarly, fishing for large striped bass and other fish that weight at least approximately 50 pounds would require making shaft 22 very firm.

Preferably, proximal end 32 of shaft 22 is slightly wider in diameter than distal end 34 and has a slight collar 36 so that fishing line 28 is received easily from reel 26. Distal end 34 of shaft 22 has a reinforced tip 38, which is discussed in more detail below.

When using a bait-cast reel 26, as shown in FIG. 1, shaft 22 is preferably connected to a pistol grip or other single-grip handle 24. Single-grip handle 24 has an attaching means 42 for attaching bait-cast reel 26 to the top of handle 24. Alternatively, attaching means 42 can be a screw plate or similar attaching means extending from reel 26.

Also, handle 24 has a connecting means 44 for connecting shaft 22 thereto. Preferably, connecting means 44 is a latch or other type of connector that connects to shaft 22 quickly and easily, and is vertically adjustable so that proximal end 32 of shaft 22 can be approximately aligned with fishing line 28 exiting bait-cast reel 26. Proper alignment between proximal end 32 of shaft 22 and reel 26 reduces tension on fishing line 28 entering shaft 22 from reel 26.

Referring now to FIG. 2, hollow fishing rod 20 is shown in its second preferred embodiment, that is, with an open-faced, spinning reel 52. Spinning reel 52 is preferably attached to the underside of a two-grip handle 54 between a pair of grips 56, 58 using an attaching means 62 similar to attaching means 42 shown in FIG. 1.

Two-grip handle 54 has a connecting means 64 for connecting handle 54 to shaft 22 when using spinning reel 52. Preferably, connecting means 64 is a pair of latches 66, 68 or other connectors for quickly and easily connecting handle 52 and shaft 22 together. Preferably, connecting means 64 connects handle 52 and shaft 22 so that shaft 22 is offset below handle 52, as shown in FIG. 2, thus allowing proximal end 32 of shaft 22 to be approximately aligned with fishing line 28 coming from open-faced spinning reel 52.

FIG. 3 shows the various layers of fishing rod 20 from a cross-sectional view. As discussed above, shaft 22 is preferably made of a flexible yet resilient material such as fiberglass, boron, graphite and the like. The interior of shaft 22 has a first coating 72 applied thereto. First coating 72 is preferably a smooth, slick, wear resistant material such as polytetrafluorethylene (available under the trademark TEFLON ®). Other smooth, wear-resistant materials include but are not limited to carbon fiber and nylon.

Preferably, first coating 72 is easily applied to the interior surface of shaft 22. Materials such as polytetrafluorethylene can be liquefied and poured into a rotating shaft 22 so that the polytetrafluorethylene flows over the entire interior surface of shaft 22. After removing the excess polytetrafluorethylene from the interior of shaft 22, the remaining is allowed to dry, thus forming first coating 72. In this manner, the desired thickness of first coating 72 can be controlled, however, first coating 72 is preferably thick enough to protect the interior surface of shaft 22, yet not so thick that it cracks during normal flexing of shaft 22.

First coating 72 is preferably nonreactive with fishing line 28, that is, fishing line 28, which is typically nylon fiber, does not stick to first coating 72 and moves freely and with minimal friction across first coating 72. Also, first coating 72 is resistant to wear caused by fishing line 28 repeatedly moving across first coating 72 when fishing line 28 is cast from and subsequently reeled into reel 26.

A second coating 74 can be applied to the interior of first coating 72 in a manner similar to the application of first coating 72 to the interior surface of shaft 22. However, second coating 74 is preferably applied only to the lower portion of first coating 72. That is, when shaft 22 is positioned for use, second coating 74 is applied only to the lower portion of first coating 72, as shown in FIG. 3. Second coating 74 is preferably a smooth, wear resistant material nonreactive to fishing line 28 so that fishing line 28 is free to move across second coating 74 without causing wear to either the interior of shaft 22 or fishing line 28. Like first coating 72, second coating 74 can be polytetrafluorethylene, carbon fiber, nylon or any material that is smooth, wear resistant and nonreactive to fishing line 28.

Second coating 74 can be applied similarly to the application of first coating 72, except that shaft 22 is not rotated and the amount of second coating 74 poured into shaft 22 is decreased so that second coating 74 flows only along the lower portion of first coating 72. Second coating 74 is then allowed to dry, forming a smooth, wear resistant path for fishing line 28 to travel, as shown in FIG. 3.

Rather than making first and second coatings in two steps, the excess of first coating 72 can be left in shaft 22, the latter held in place as coating 72 dries or cures so that coating 72 is thicker along one side of the interior of shaft 22.

Distal end 34 of shaft 22 has a tip 38 that is made of a strong, reinforcing, wear resistant material such as ceramic or porcelain. Preferably, reinforced tip 38 is formed at distal end 34 of shaft 22 by dipping shaft 22 into a ceramic or porcelain mixture so that distal end 34 of shaft 22 is coated. Upon drying, reinforced tip 38 protects distal end 34 of shaft 22 and prevents the distal edge of shaft 22 from fraying. Reinforced tip 38 is used especially when shaft 22 is made of fiberglass, which has a tendency to wear or fray at the edges.

In use, shaft 22 is connected to handle 24 or handle 54, depending on whether fishing reel 26 or 52, respectively, is desired. Fishing line 28 is then fed through shaft 22 from proximal end 32 to distal end 34, for example, using a weight attached to fishing line 28. Fishing rod 20 is then used in the normal manner for fishing.

Hollow shaft 22 protects fishing line 28 from tangling during operation and storage of fishing rod 20. The use of first coating 72, and possibly second coating 74, allows fishing line 28 to move freely within shaft 22, thus maintaining the sensitivity of fishing rod 20. Also, the free flow of fishing line 28 along the interior of shaft 22 reduces, if not eliminates, backlashing of fishing line 28.

It will be apparent to those skilled in the art that many changes and substitutions can be made to the preferred embodiment herein described without departing from the spirit and scope of the present invention as defined by the appended claims.

What is claimed is:

1. A fishing rod, said fishing rod for use with a handle mounted thereon and a fishing reel having fishing line, said rod comprising:
   a flexible shaft, said shaft having an interior surface and an exterior surface;
   a first coating applied to said interior surface, said first coating made of a material that facilitates movement of said fishing line along said interior surface; and
   a second coating applied to a portion of said first coating, said second coating overlaying said portion so that when said fishing rod is oriented for use, said fishing line is positioned on and moves across said second coating, said second coating made of a material that resists wear of said fishing line along said interior surface.

2. The rod as recited in claim 1, wherein said first coating is polytetrafluorethylene.

3. The rod as recited in claim 1, wherein said second coating is polytetrafluorethylene.

4. The rod as recited in claim 1, wherein said shaft is selected from the group consisting of fiberglass, boron, graphite, and titanium.

5. The rod as recited in claim 1, wherein said flexible shaft has a first end and a second end and wherein said exterior surface of at least one of said first and second ends is coated with a ceramic.

6. The rod as recited in claim 1, wherein said shaft has a length in the range of approximately 5.50 feet to 8.00 feet.

7. A fishing rod, said fishing rod for use with a fishing reel having fishing line, said fishing rod comprising:
   a cylindrical shaft made of a flexible material, said shaft having a proximal end, a distal end, an interior surface and an exterior surface, said shaft tapering from said proximal end to said distal end;
   a first coating applied to said interior surface from said proximal end to said distal end, said first coating made of a material that facilitates movement and resists wear of said fishing line along said interior surface;
   a second coating applied to a portion of said first coating from said proximal end to said distal end so that when said fishing rod is oriented for use, said fishing line is positioned on and moves across said second coating, said second coating made of a material that resists wear caused by movement of said fishing line along said interior surface; and
   a handle connected to said proximal end of said shaft and integral therewith, said fishing reel mounted on said handle so that fishing line moves along said portion of said interior surface from said proximal end to said distal end.

8. The rod as recited in claim 7, wherein said second coating is selected from the group consisting of carbon fiber, nylon, and polytetrafluorethylene.

9. The rod as recited in claim 7, wherein said first coating is selected from the group consisting of polytetrafluorethylene, carbon fiber, and nylon.

10. The fishing rod as recited in claim 7, wherein said shaft has a longitudinal axis and wherein said apparatus further comprises means connected to said handle for connecting said handle to said proximal end of said shaft, said connecting means being adjustable so that, when said handle is mounted on said proximal end of said shaft, said fishing line is approximately axially aligned with said longitudinal axis at said proximal end of said shaft.

11. The rod as recited in claim 7, wherein said distal end has a tip coated with ceramic.

12. The rod as recited in claim 7, wherein said shaft is selected from the group consisting of fiberglass, boron, graphite, and titanium.

13. A fishing rod, said rod for use with a fishing reel having fishing line, said fishing rod comprising:
   a cylindrical shaft made of a flexible material, said shaft having a proximal end, a distal end, an interior surface and an exterior surface;
   a first coating applied to said interior surface from said proximal end to said distal end, said first coating made of a material that facilitates movement of said fishing line along said interior surface;
   a second coating applied to a portion of said first coating from said proximal end to said distal end so that when said fishing rod is oriented for use, said fishing line is positioned on and moves across said second coating, said second coating made of a material that resists wear of said fishing line along said interior surface; and
   a handle mounted on said proximal end of said shaft, said fishing reel mounted on said handle so that said fishing line moves along said portion of said interior surface from said proximal end to said distal end.

14. The rod as recited in claim 13, wherein said first coating is selected from the group consisting of polytetrafluorethylene, carbon fiber, and nylon.

15. The rod as recited in claim 13, wherein said second coating is selected from the group consisting of carbon fiber, nylon, and polytetrafluorethylene.

16. The rod as recited in claim 13, wherein said distal end has a tip coated with ceramic.

17. The fishing rod as recited in claim 13, further comprising means attachable to said handle for connecting said handle to said shaft so that said handle is offset from said proximal end of said shaft.

18. The fishing rod as recited in claim 13, wherein said shaft has a longitudinal axis and wherein said apparatus further comprises means for connecting said handle to said proximal end of said shaft, said connecting means being adjustable so that, when said handle is mounted on said proximal end of said shaft, said fishing line is approximately axially aligned with said longitudinal axis at said proximal end of said shaft.

19. The rod as recited in claim 13, wherein said shaft is selected from the group consisting of fiberglass, boron, graphite, and titanium.

20. The fishing rod as recited in claim 13, wherein said handle is mounted on said proximal end of said shaft so that said handle is integral therewith.

* * * * *